Figure 1:
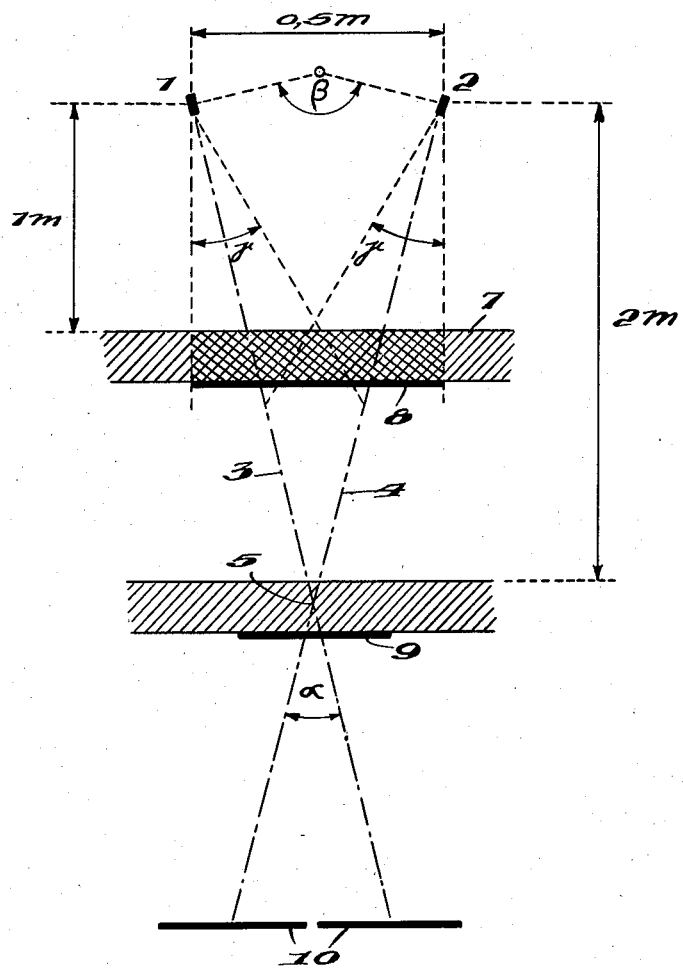

INVENTOR
Rolf Wideröe
BY Pierce, Scheffler & Parker
ATTORNEYS

June 17, 1958  R. WIDERÖE  2,839,680
PROCESS AND DEVICE FOR TESTING MATERIALS
BY MEANS OF ENERGY-RICH X-RAYS
Filed May 12, 1953  3 Sheets-Sheet 3
Fig. 4.
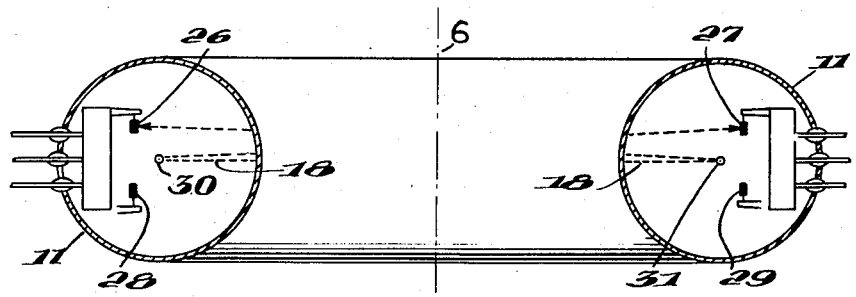
Fig. 5a.
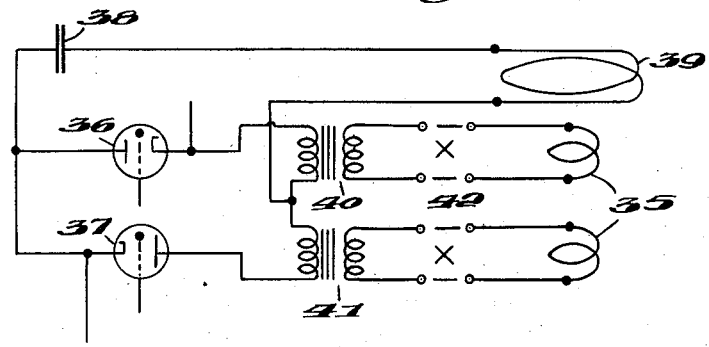
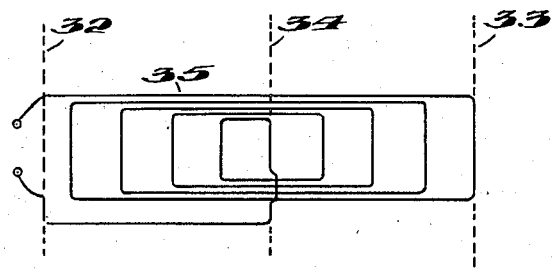
Fig. 5b.
INVENTOR
Rolf Wideröe
BY Pierce, Scheffler & Parker
ATTORNEYS

United States Patent Office 2,839,680
Patented June 17, 1958

---

2,839,680

PROCESS AND DEVICE FOR TESTING MATERIALS BY MEANS OF ENERGY-RICH X-RAYS

Rolf Wideroe, Ennetbaden, Switzerland, assignor to Aktiengesellschaft Brown, Boveri & Cie, Baden, Switzerland, a joint-stock company Application May 12, 1953, Serial No. 354,500

Claims priority, application Switzerland May 14, 1952

6 Claims. (Cl. 250—27)

The present invention relates to electron accelerators of the magnetic induction type which are commonly referred to as betatrons or ray transformers.

The X-rays produced in the betatron by bombarding an anticathode with high-speed electrons are particularly suitable, as known, for testing materials. With the application of a 30 m. e. v. radiation, defective spots of about 1% of the radiated thickness can be well recognized; for example, an air cavity of about 1 mm. diameter in an iron body of 10 cm. thickness.

In such tests the time required for positioning the objects, attaching the radiation-sensitive layers (plates, films) etc., is much greater than the radiation time. The latter is for metallic objects of 10 cm. thickness about 1 minute, if the distance between the object and the anticathode is 1 m. The testing of larger objects, which has to be done in sections, requires a considerable amount of time, which can be reduced only to a small extent if rays with a higher energy content are used.

Defects can be easily determined with the application of known arrangements. But the exact localization, that is, the determination in what depth of the object the defect is to be found can only be done by means of photographs taken from various directions. This process is time-consuming according to the foregoing statements.

The object of the present invention is first, a novel method for testing materials by means of the X-rays of a two ray betatron. It is characterized by the fact that the object to be tested is radiated with two bundles of X-rays, with intersecting axes. If the object is placed in a first distance from the sources of radiation, the relatively large section radiated to determine defects will be large, if the object is placed in a second distance, about twice the amount, then the area radiated to determine defects will be half the size.

The object of the invention is in the second place a novel apparatus for carrying out said method. It is characterized by the fact that at least one pair of anticathodes is arranged in the toroid-shaped acceleration tube, which lie on radii that form an angle of at least 160 degrees in the axis of the betatron and that means are provided which alternatingly direct the electrons, accelerated alternatingly in different directions of rotation, on the anticathodes of one pair.

It is desired to point out here that betatrons are known which produce two bundles of X-rays simultaneously. These bundles are produced mostly by bombarding a single anticathode alternatingly from two sides and operate in two directions differing from each other by 180 degrees, so that each one can be used independent of the other.

The principle of the invention can be seen from Fig. 1. It shows the two anticathodes 1 and 2, each of which produces a bundle of X-rays whose axes 3 and 4 respectively intersect at the point 5 at an angle, which according to the invention, is at most 20 degrees, but which is drawn larger in the figure for reasons of clarity. If, as usual, the axes of the X-ray bundles form tangents on the orbit traversed by the electrons, the radii put through the anticathode in the axis 6 of the betatron (see Fig. 2) must form the angle, which is according to the invention greater than 160 degrees.

The measurements entered in Fig. 1 by way of an example refer to the 30 m. e. v. betatron. The bundles of X-rays produced by it can be used within aperture angles of about 15 degrees for testing materials. Rays emerging with larger aperture angles are preferably absorbed by suitable shutters. In a distance of about 1 m. from the anticathode the two bundles begin their penetrating action. If the object 7 is arranged in this distance, a section of about 50 cm. length can be tested with one position and with one radiation (cross hatched) that is, the number of the photographs necessary for testing one section is reduced to half the amount required if one single bundle of X-rays is used. For photographs of this kind it is advisable to arrange the radiation-sensitive layer 8 directly behind the object 7.

If the object is placed at a distance of 2 m. from this anticathode, it will be in the intersection 5 of the axes of the bundles. A defect located in the radiated section, will, therefore, be reproduced twice on a radiation-sensitive layer 9 arranged behind the object. The location of the depth of the defect can be determined in a very simple manner from the distance of the pictures.

If the defective spot has a complicated form or if it is very large, the picture may become unclear, making the determination of the exact location impossible. In such cases it is advisable to arrange the radiation-sensitive layer at a suitable distance (for example 1 m.) behind the object so that two enlarged pictures 10 will appear on it side by side, which are projected from two different points. It is of advantage to limit the aperture angles by suitable shutters to the necessary value. The pictures produced can be evaluated stereoscopically. It is simpler to arrange two radiation-sensitive layers successively on the back of the object (at 9) instead of the foregoing solution and to perform the radiation with one bundle at a time. This way we also obtain a pair of pictures that can be evaluated stereoscopically and which shows the defective spot approximately in natural size.

Practical experience has shown that the angle α must not exceed the above mentioned order of magnitude if stereoscopic evaluation with objects of 10 to 20 cm. thickness is to be reliable. As particularly suitable has proved an angle of intersection of 15 degrees between the two axes of the bundles. The respective angle β is then 165 degrees. In order to be able to operate with the most favorable angle in each case, the application of two bundles from a multiplicity of X-ray bundles intersecting at various angles, up to the maximum value, is made possible in a further development of the invention.

In the device according to the invention a pair of anticathodes is used in each case to produce the two X-ray bundles, for which the angle β greater than 160 degrees is used. The anticathodes are hit alternatingly by the electrons which are accelerated in different directions of rotation. In order to prevent any interference with the acceleration process itself, the anticathodes (see Fig. 2) are arranged outside a certain toroid-shaped area around the equilibrium circle 18. At the end of each acceleration period the circular path of the electrons is deformed in suitable manner, so that the electrons impinge on one of the anticathodes. There are now different possibilities for directing the electrons, accelerated in one direction of rotation, to the respective anticathode.

(1) One anticathode is arranged outside, the other inside the equilibrium circle in its plane. After each acceleration of the electrons in one or the other directions the orbit is enlarged (so-called expansion) after each acceleration, in the other direction it is diminished. Suitable means for enlarging and diminishing the orbit are known already.

(2) One anticathode is arranged above, the other below the plane of the equilibrium circle; its distance from the axis of the betatron be, for example, greater than the radius of the equilibrium circle. After each acceleration of the electrons in one direction, the orbit will be enlarged and at the same time lifted; after each acceleration in the other direction it will be enlarged and at the same time lowered.

Figure 2:
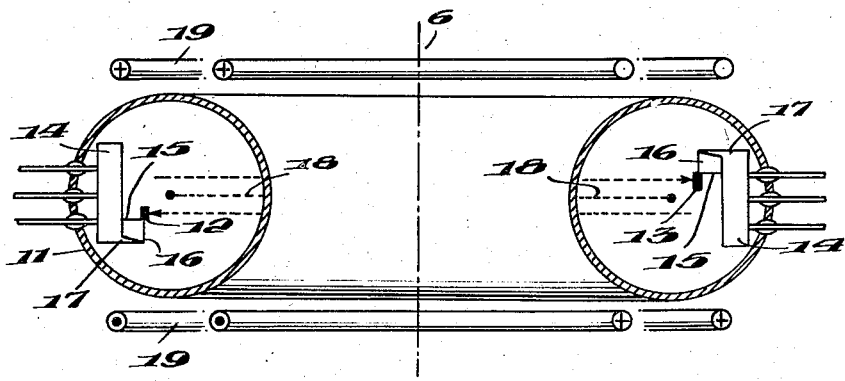
Figure 3:
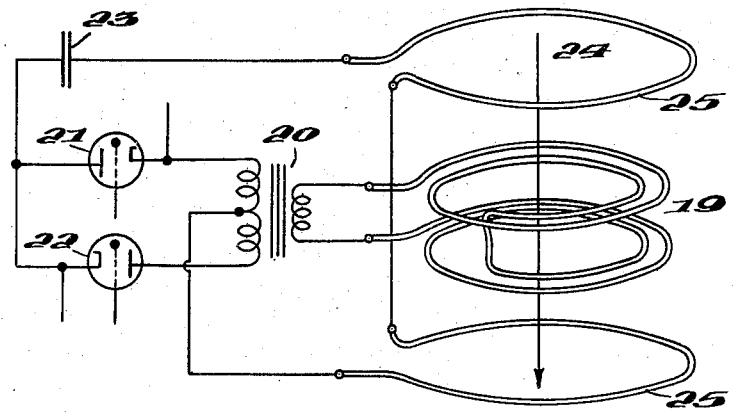

An embodiment of the invention is described here by means of Figs. 2 and 3; Fig. 2 shows a section through the toroid-shaped tube 11 containing the axis 6 of the betatron. The two anticathodes 12 and 13 are represented in the figure for simplicity's sake as diametrically opposed. In reality this is only approximately so, because they are by at least 160 deg. apart. Each anticathode is fastened to a case 14 which contains an electron source. The fastening means are the thin carriers 15 and 16, which latter is propped against the thicker carrier 17. During the acceleration the electrons pass through a relatively narrow toroid-shaped area around the equilibrium circle 18. For lifting and lowering the orbital plane after each acceleration a radial magnetic field is produced by the winding 19. The form of these windings as well as a circuit to produce the impulse current passing through them, can be seen from Fig. 3. The feeding of the turns 19 occurs from the secondary side of the transformer 20, whose primary windings lie in the circuit of one of the thyratrons 21 and 22 respectively. These thyratrons, together with the condenser 23 and the coils 25 traversed by the magnetic flux 24 in the central core of betatron, form the arrangement described in United States Patent No. 2,654,838 for the production of expansion impulses.

For a better understanding of the method of operation it is desired to explain this arrangement here briefly. A sinusoidal voltage is induced in the coil 25 by the magnetic flux in the central core of the betatron. The condenser 23 is charged over one of the thyratrons 21, 22 to the peak value of the induced voltage. At the time of the expansion, that is, at the zero passage of the induced voltage, the second thyratron is ignited by starting a suitable grid voltage. The energy accumulated in the condenser is discharged over this thyratron and over the coil 25; due to the low losses the condenser is charged again with reversed potential to almost the same value it had before the ignition of the second thyratron. This recharging process produces the expansion impulse in the coil 25. The losses are recovered in this way that the condenser is charged to the second peak value of the induced voltage by the second thyratron which has remained conductive all the time.

According to the present invention the windings 19 for lifting and lowering the orbit are energized by the discharge currents of the two thyratrons in a known arrangement. Due to the circuit indicated in Fig. 3, impulses of constant polarity are generated in the windings 19 which effect alternatingly the lifting and lowering of the orbit since the electrons change their direction of rotation. In the coil 25 however, are impulses of alternating polarity so that each parallel displacement of the orbital plane causes an expansion.

Both anticathodes can be arranged on the same side of the plane of the equilibrium circle for example above. After each acceleration of the electrons, the orbit is tilted by a diameter which lies in the angle bisector of the radii pointing from the axis of the betatron to the anticathodes. The tilting is effected for example, by radial magnetic fields which are directed on one side of the above mentioned diameter toward it, on the other side, away from it.

Both anticathodes can also be arranged outside the equilibrium circle in its plane. After each acceleration of the electrons, the orbit is displaced in direction of the anticathode to be bombarded. Means for influencing the path of the electrons in the desired manner are described in the Swiss Patent No. 265,656.

Likewise, it is possible with the same means to produce the deflections not in the plane of the orbit but for example in the direction of the axis of the betatron, in which case the anticathodes have to be arranged above and below the equilibrium circle with a distance from the axis of the betatron which corresponds to the radius of the equilibrium circle.

Many of the enumerated possibilities can be combined with each other. Of particular interest are those combinations which permit the arrangement of several pairs of anticathodes, which produce X-ray bundles with different angles of intersection and where the pair to be used can be selected by a simple switch.

An example of operation is shown in Fig. 4. The acceleration tube 11 represented there contains four anticathodes 26, 27, 28, 29, with the anticathodes 26 and 27 arranged above the equilibrium circle 18 producing bundles of X-rays with an angle of intersection for example of 15 degrees, while the anticathodes 28 and 29 arranged below the equilibrium circle produce bundles of X-rays with an angle of intersection for example of 7.5 degrees, or even 0 degree. The orbit of the electrons has to be tilted after each acceleration at the points 30 and 31 respectively. For this purpose are two coils provided which produce a radial magnetic field that has at the points 30 and 31 respectively the value zero and its maximum value $H_{max}$ in each case at the diametrically opposed point. If $\Omega$ designates the sector angle measured from points 30 and 31 respectively on the axis of the betatron, the field in between shall have the course: H equals $\frac{1}{2}H_{max}(1-\cos \Omega)$.

One of the coil to be provided will then effect the tilting around the point 30, the other coil the tilting around the point 31. For operating the upper anticathodes, impulse currents have to be sent through the coils with one polarity, for operating the lower anticathodes currents with the other polarity.

The form of these coils as well as the devices for producing the impulse current necessary to energize them, can be seen from Figs. 5a, 5b. Fig. 5b shows one of the coils in an unwound state. The points 32 and 33 coincide actually and are located at the point where the radial field is supposed to have the value zero (for one coil at this point 30) point 34 is located at the associated anticathodes 27 and 29.

Fig. 5a shows a circuit for producing impulse currents in the coils 35. The device, consisting of the thyratrons 36 and 37, the condenser 38 and the expansion coil 39, corresponds to the device for producing expansion impulses described above. The transformers 40 and 41 respectively are provided in the discharge circuit of each thyratron whose secondary winding energizes one of the coils 35. These coils are traversed alternatingly by impulse currents and tilt the orbit alternatingly around the points 30 and 31 respectively of Fig. 4, for example, upward. Under the effect of the expansion, taking place at the same time, the accelerated electrons will, therefore, impinge alternatingly on the anticathodes 26 and 27 respectively. If one desires to work with the anticathodes 28 and 29 respectively the orbit has to be tilted downward around the points 31 and 30 respectively. For this purpose, it is only necessary to change the polarity of the impulse currents passing through the coils 35, Fig. 5, by means of the symbolically represenetd switching device 42.

Naturally it is also possible, by analogous application of the described or similar devices, to provide three anticathodes, for example, where the two parts to be used will have one anticathode in common.

I claim:

1. A magnetic induction accelerator of the double ray type comprising a chamber within which successive electron streams are accelerated respectively in opposite directions around an orbit, at least one pair of anticathodes located in both radially and axially displaced positions from the orbit of electron acceleration, a first coil so oriented as to cause the accelerated streams of electrons to be displaced radially from the orbit of acceleration, a circuit for periodically energizing said coil, said circuit including a pair of electric discharge devices connected in back-to-front relation and a condenser in series therewith connected periodically to said coil through said electric discharge devices in alternation for discharge into said coil, means for charging said condenser between successive discharges thereof, a second coil so oriented as to the cause the accelerated streams of electrons to be displaced from the plane of the orbit of acceleration, said second coil being connected for periodic energization by said condenser simultaneously with energization of said first coil whereby said accelerated electron streams are caused to be deflected both radially and axially of the plane of the orbit and thereby to strike said anticathodes.

2. A double ray magnetic induction accelerator as defined in claim 1 wherein said anticathodes are positioned outside the orbit of electron acceleration and on different sides of the plane containing said orbit, the orientation of said second coil being such as to alternately and periodically raise and lower the trajectory of said successive accelerated streams of electrons.

3. A double ray magnetic induction accelerator as defined in claim 2 and which includes a transformer having a divided primary winding and a secondary winding, the halves of said primary winding being connected respectively in circuit with said electric discharge devices, and said second coil being connected in circuit with said secondary winding.

4. A double ray magnetic induction accelerator as defined in claim 1 wherein two pairs of anticathodes are provided, the anticathodes of one pair being located on radii which form an angle of 165° with respect to the axis of the accelerator and the anticathodes of the other pair forming a greater angle with respect to the axis of the accelerator.

5. A double ray magnetic induction accelerator as defined in claim 4 wherein one of the anticathodes is common to each pair.

6. A double ray magnetic induction accelerator comprising a chamber within which successive electron streams are accelerated respectively in opposite directions around an orbit, two pairs of anticathodes located in both radially and axially displaced positions from the orbit of electron acceleration, a first coil so oriented as to cause the accelerated electron streams to be displaced radially from the orbit of acceleration, a circuit for periodically energizing said coil, said circuit including a pair of electric discharge devices connected in back-to-front relation and a condenser in series therewith connected periodically to said coil through said electric discharge devices in alternation for discharge into said coil, means for charging said condenser between successive discharges thereof, a pair of auxiliary coils so oriented as to effect a tilting in opposite directions of the trajectory paths of the oppositely accelerated streams of electrons, a pair of transformers, circuit means including a reversing switch for connecting said auxiliary coils with the secondary windings respectively of said transformers, the primary windings of said transformers being connected respectively in the circuits of said electric-discharge devices.

References Cited in the file of this patent

UNITED STATES PATENTS

| | | |
|---|---|---|
| 2,297,305 | Kerst | Sept. 29, 1942 |
| 2,447,255 | Kerst | Aug. 17, 1948 |
| 2,473,956 | Kerst | June 21, 1949 |
| 2,538,718 | Wideroe | Jan. 16, 1951 |
| 2,675,470 | Wideroe | Apr. 13, 1957 |

FOREIGN PATENTS

| | | |
|---|---|---|
| 55,516 | Netherlands | Nov. 15, 1943 |